Dec. 29, 1964    L. A. MARTIN    3,163,844
MULTIPLE-BEAM ANALOG BEAM-FORMING SYSTEM FOR SONAR ARRAYS
Filed Oct. 3, 1960    6 Sheets-Sheet 1

INVENTOR.
LYNN A. MARTIN,
BY Robert H. Himes
ATTORNEY

Dec. 29, 1964 L. A. MARTIN 3,163,844
MULTIPLE-BEAM ANALOG BEAM-FORMING SYSTEM FOR SONAR ARRAYS
Filed Oct. 3, 1960 6 Sheets-Sheet 2

INVENTOR.
LYNN A. MARTIN,
BY
Robert H. Himes
ATTORNEY

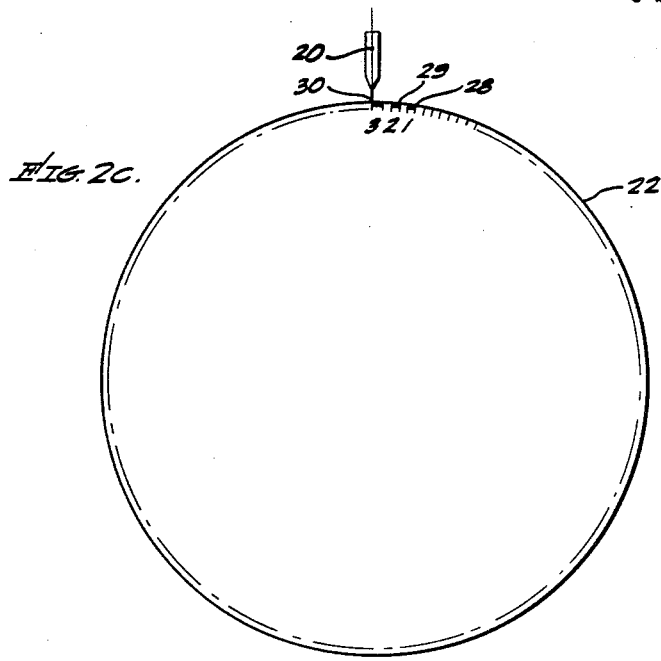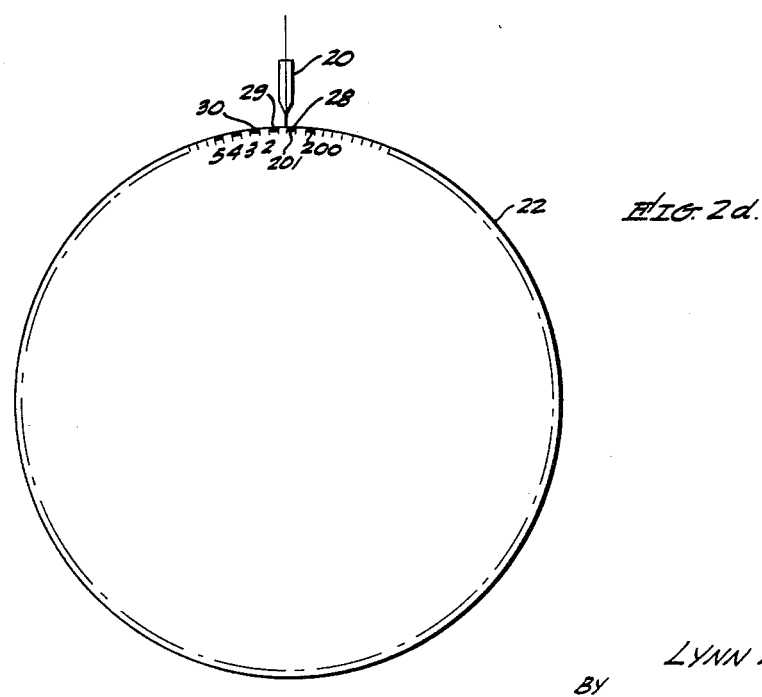

Dec. 29, 1964   L. A. MARTIN   3,163,844
MULTIPLE-BEAM ANALOG BEAM-FORMING SYSTEM FOR SONAR ARRAYS
Filed Oct. 3, 1960   6 Sheets-Sheet 4

INVENTOR.
LYNN A. MARTIN,
BY
Robert H. Himes
ATTORNEY

INVENTOR.
LYNN A. MARTIN,
BY Robert H. Himes
ATTORNEY.

United States Patent Office 3,163,844
Patented Dec. 29, 1964

3,163,844
MULTIPLE-BEAM ANALOG BEAM-FORMING
SYSTEM FOR SONAR ARRAYS
Lynn A. Martin, Anaheim, Calif., assignor to Hughes
Aircraft Company, Culver City, Calif., a corporation of
Delaware
Filed Oct. 3, 1960, Ser. No. 60,125
4 Claims. (Cl. 340—6)

This invention relates to a data processor and, more particularly to a general purpose real-time analog-digital apparatus for providing multiple beam forming and steering for all types of multiple hydrophone sonar arrays.

It has been the practice to effect multiple beam formation and steering, i.e., providing input signal frequency information only through the use of digital or acoustical delay lines. Alternatively, single beam formation and steering in non-real-time has been achieved by reiterative utilization of a tape recorder to provide the desired delays necessary. Thus, the present art either provides only input signal frequency information in real-time or single beam formation and steering in non-real-time.

In the present invention, use is made of the fact that a sinusoidal voltage waveform may be sampled no less than two times during each cycle and can be re-constituted from the samples without undue distortion. In general, the system comprises an array of hydrophones adapted to transduce respective portions of acoustic waves incident thereon. The voltage waveforms from each hydrophone are amplified, filtered and sampled and the samples from each hydrophone "packed" on a magnetic drum capable of storing both amplitude and polarity. The magnetic drum must have sufficient capacity so as to be capable of storing "packed" samples from a period of time corresponding to the maximum distance between hydrophones in the array if "end-fire" beams are to be formed. One manner in which the samples may be "packed" about the periphery of a drum is, for example, to write successive samples once every circumference plus one bit interval. Apparatus is then provided to add predetermined samples from each track to form a plurality of beams having discrete "look" angles. In selecting the samples to form these beams, means is provided to select the sample nearest the desired position. Thus, by way of example, samples that are added that appear concurrently on the tracks form a beam that is broadside to the array of hydrophones. On the other hand, where the maximum delay between samples that are added is equal to the time required for an acoustic wave to travel between hydrophones having maximum spacing therebetween, an "end-fire" beam is formed. Intermediate delays form beams that are in between the broadside and the end-fire beams. The successive pulse waveforms resulting from the respective additions are then detected to produce output signals representative of the acoustic wave as received from the various "look" directions.

The above-mentioned and other features and objects of this invention and the manner of obtaining them will become more apparent by reference to the following description taken in conjunction with the accompanying drawings, wherein:

FIGS. 2a, 2b, 2c and 2d show one method of "packing" the samples from the samplers of FIG. 1 around the periphery of a magnetic drum;

Figure 1:
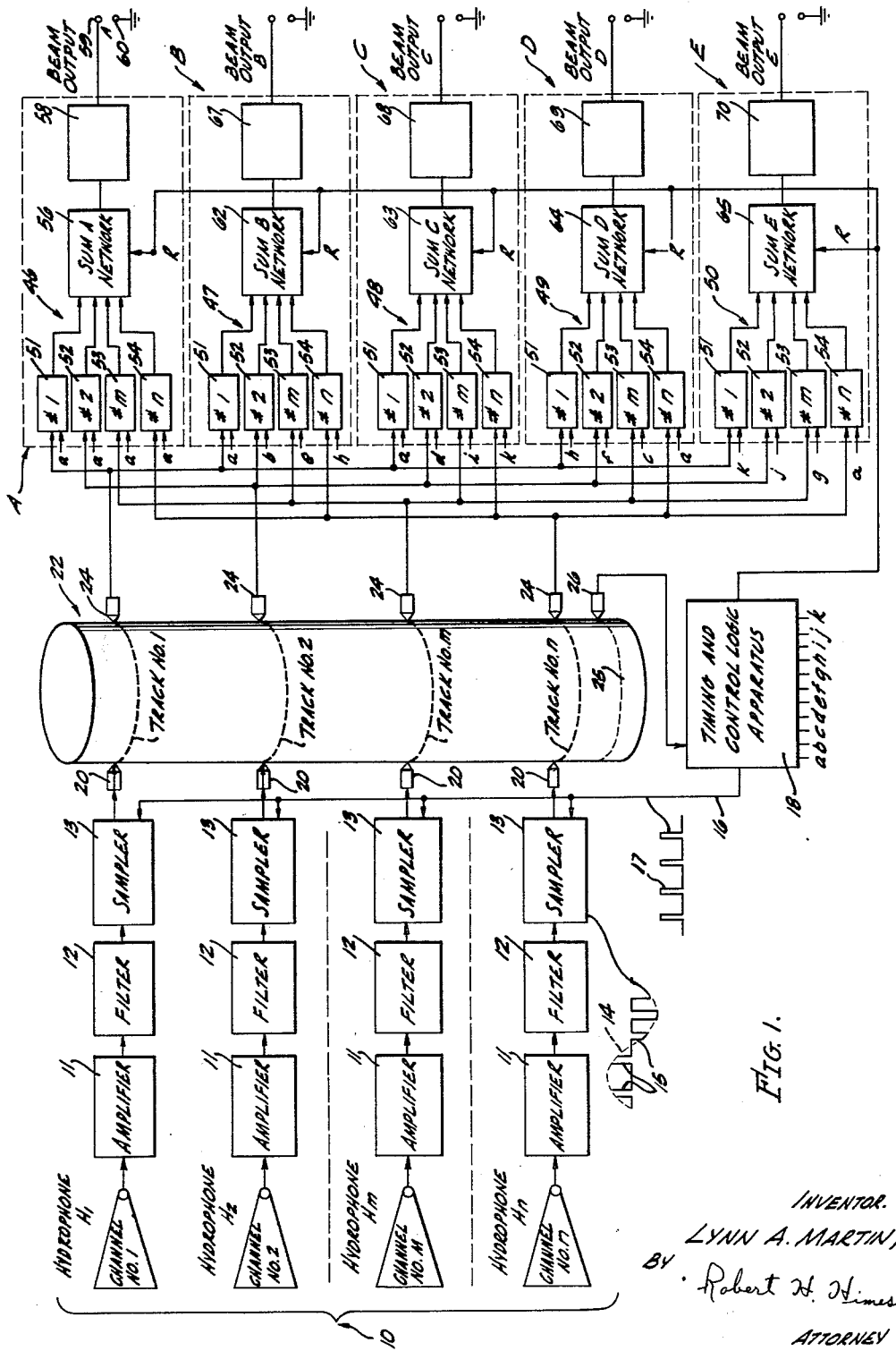
FIG. 1 illustrates a schematic block diagram of an embodiment of the present invention.

Referring to FIG. 1 of the drawings, there is illustrated a schematic block diagram of an embodiment of the present invention which includes an array 10 of hydrophones which may be linear, two-dimensional, circular or spherical. However, by way of example, a linear array on $n$ hydrophones designated as $H_1$, $H_2$ . . . $H_m$ . . . $H_n$ with a uniform distance "$d$" between successive hydrophones thereof is illustrated wherein $H_m$ is any of the $n$ hydrophones. Each of the hydrophones $H_1$, $H_2$ . . . $H_n$ provides an input to a corresponding channel No. 1, channel No. 2, . . . channel No. $n$, respectively. The output from the hydrophones $H_1$, $H_2$ . . . $H_n$ of channels Nos. 1, 2 . . . $n$, respectively, are amplified by amplifiers 11 and the respective outputs therefrom passed through lowpass filters 12. The passband of the filters 12 may, for example, extend from 0 to the order 500 cycles per second depending upon the range of objects it is desired to detect. In practice, it is generally desirable to combine each hydrophone, $H_m$, with its associated amplifier 11 and lowpass filter 12 together in a single module so as to minimize noise and interaction with the other hydrophones of the array 10.

The signals available at the outputs of the filters 12 are applied to samplers 13 which sample the respective voltage waveforms, indicated by dashed line 14, available at the outputs of the filters 12 at a rate of the order of 2000 times per second. This sampling rate is approximately four times per cycle for the highest frequency of the voltage waveform 14. These samples constitute successive voltage pulses 15 having a polarity and amplitude representative of the instantaneous amplitude of the waveform 14 being sampled. Thus, as generally known, the waveforms 14 may be reconstituted from the successive voltage pulses without undue distortion. The respective samplers 13 are controlled by a 2 kilocycle per second pulse waveform 17 applied thereto over a lead 16 from a time and logic control apparatus 18, the manner of operation of which will be hereinafter explained in more detail.

The sample pulses 15 available at the respective outputs of the samplers 13 are applied to writing heads 20 which are adapted to write along parallel tracks Nos. 1, 2, . . . $n$ corresponding to channels Nos. 1, 2 . . . $n$, respectively, on a magnetic drum 22. Writing heads 20 are characterized in that previous information on the magnetic drum immediately beneath a writing head 20 is erased at the time new information is written. Also, the magnetic drum 22 is of a type which stores both polarity and amplitude of a signal. In particular, the record surface of the rotor of drum 22 is electroplated with 0.0003 in. thickness of nickel cobalt (80% Co, 20% Ni) permanent magnet material with a residual flux remanance of 7500 gauss. The base material is a thin plating of copper bonded to electroless nickel which in turn is bonded to an extruded aluminum cylinder. The stator of drum 22, on the other hand, is a coextensive aluminum cylinder having a coefficient of thermal expansion that is the same as that of the rotor to minimize air-gap variations due to thermal effects. Each of the tracks produced by a writing head 20 is provided with a corresponding read head 24 which in each case is disposed in the same relative position along the respective tracks Nos. 1, 2, $m$ and $n$ with respect to its associated write head 20, i.e., the read heads 24 need not be placed immediately adjacent the respective write heads 20. In the event that read heads 24 are not placed immediately adjacent the respective write heads 20, however, necessitates the introduction of a delay in the selection of samples equivalent to the time required for the drum to rotate from the write head 20 to the read head 24. In addition, read heads 24 are characterized in that they read a signal stored on the drum 22 with minimum deteriorating effect, i.e., read heads 24 read a signal without erasing it. Lastly, a timing track 25 is disposed around the drum 22 constituting, for example, 200 equally spaced markers and having a read head 26 adapted to produce a pulse output signal each time a marker is rotated thereunder. An output from each of the read heads 24 associated with the tracks Nos. 1, 2 . . . *m* . . . *n* is applied to an input of each beam forming apparatus A, B, C, D and E. The function of the beam forming apparatuses A, B, C, D or E is to produce a signal corresponding to a specific "look" angle in response to an appropriate sample from each of the channels Nos. 1, 2 . . . *m* and *n* as determined by the timing and control logic apparatus 18.

Figure 2A:
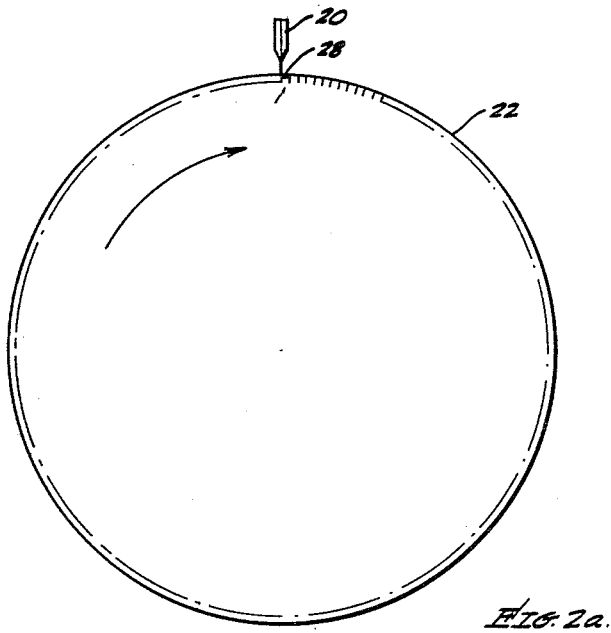
Figure 2B:
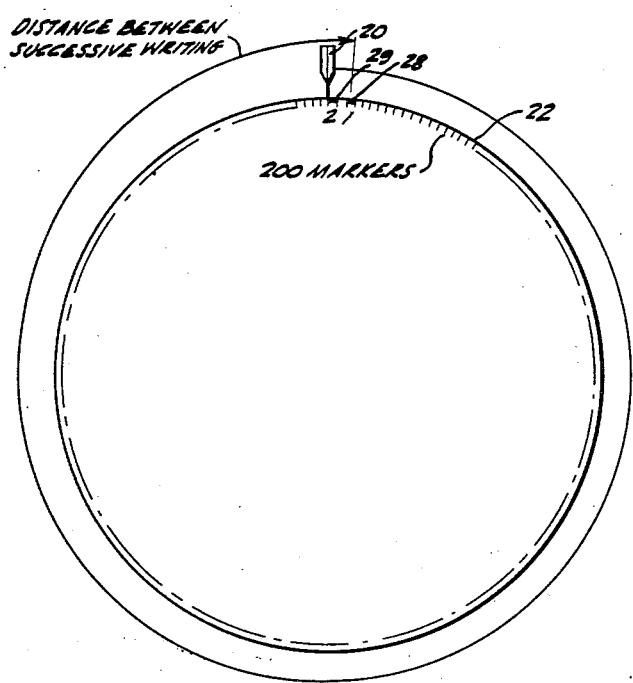

Referring now to FIGS. 2*a* to 2*d*, wherein the drum 22 and a write head 20 are shown in cross-section, there is illustrated the manner in which the samples 15 are "packed" around the respective tracks of the drum 22. In particular, the timing and control logic apparatus 18 is designed to produce a gating signal upon the passage of plus or minus one plus the number of markers in a complete circumference about drum 22 along the track 25 beneath the read head 26. In the present example, this would be 200±1, i.e. 199 or 201 markers. Referring to FIGS. 2*a–d*, there is shown the manner in which samples are packed about the drum 22 when samples are taken every 201st marker. Referring to FIG. 2*a*, the write head 20 writes a first sample pulse along a portion 28 of the track. Continued rotation of the drum 22 passes 200 markers of the timing track 25 under read head 26 before commencing to take and record another. That is, the next sample is taken and recorded concurrently with the passing of the 201st marker of the timing track 25 under read head 26. Thus, the drum 22 rotates one complete revolution prior to the next sample being written along a portion 29 of the track immediately following the portion 28 as indicated in FIG. 2*b*. Similarly, a third sample is written on a portion 30 of the track immediately following the portions 28, 29 as shown in FIG. 2*c*. This procedure is continued until the entire track is filled with recorded samples at which time the 201st sample is written along the portion 28 in a manner to replace the first sample, as illustrated in FIG. 2*d*. In this manner, the newest sample always replaces the oldest sample on each respective track. If it is desired to form "end-fire" beams, the delay time between the most recent and the earliest sample should be no less than the time required for an acoustic wave to travel between the hydrophones of the array 10 which are spaced a maximum distance apart. In the case of a linear array, the hydrophones $H_1$ and $H_n$ are spaced a maximum distance apart. The maximum delay time may be decreased if the beams to be formed are less than 90° from broadside to the array 10. Also, under certain circumstances there may be limitations on the angular velocity at which the drum 22 can be rotated. Under these circumstances, it may be desirable to use two or more write heads 20 for each track. The angular velocity of the drum 22 is decreased proportionately with the addition of each write head. The length of each track, i.e., the circumference of the drum 22, on the other hand, is proportionately increased. For example, the use of two write heads 20 about each track allows the angular velocity to be halved and necessitates doubling the circumference of the drum. Increased resolution along a track will, of course, obviate this latter condition.

It is to be noted than when each sample is taken every 201st marker, the samples having progressively less delay pass under the read heads 24. If it is desired to have samples having progressively increasing delays pass under the read heads 24, samples should be recorded every 199th marker.

Figure 3:
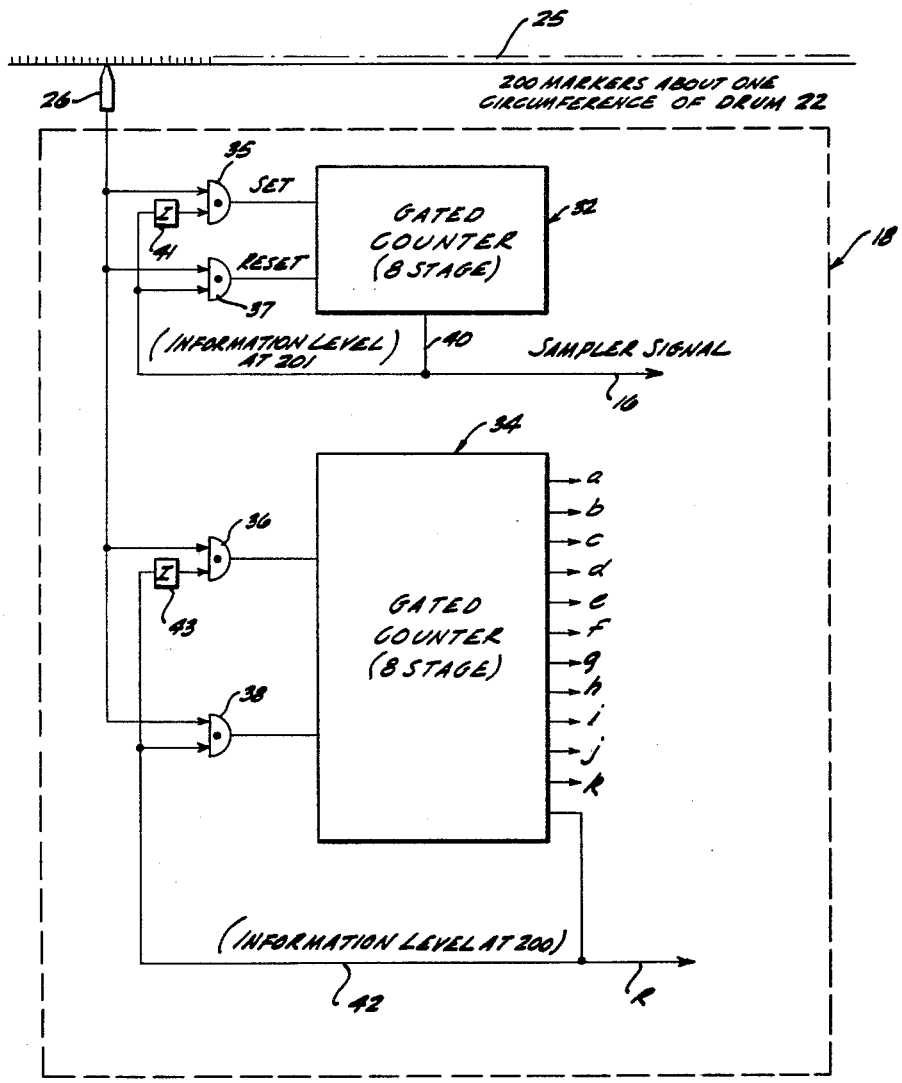
FIG. 3 illustrates a schematic block diagram of the timing and control logic apparatus of FIG. 1.

Referring to FIG. 3, there is illustrated a schematic block diagram of an embodiment of the timing and control logic apparatus 18. The timing and control logic apparatus 18 is connected to the output of the read head 26 and thus receives 200 pulses per revolution or approximately 400,000 pulses per second. The apparatus 18 comprises 8-stage gated counters 32 and 34. An 8-stage digital counter constitutes eight flip-flops connected to operate in cascade. Proceeding along the cascade of flip-flops from the input end, a principal output from each flip-flop represents, respectively, $2^0$, $2^1$, $2^2$, $2^3$, $2^4$, $2^5$, $2^6$ and $2^7$, or 1, 2, 4, 8, 16, 32, 64 and 128. Thus an 8-stage binary counter can register a number equal to $$1 + \sum_{n=1}^{n=7} 2^n$$

Each application of an information level signal to the set input of the counter will increase the number registered by one. The application of an information level signal to the reset input, on the other hand, will return all the flip-flops of the counter to the zero state, i.e., the respective principal outputs thereof are returned to the zero level.

In particular, the output lead from read head 26 is applied through two-input "and" gates 35, 36 to the set inputs of the counters 32, 34, respectively, and through two-input "and" gates 37, 38 to the reset inputs of counters 32, 34, respectively. Further, for progressively decreasing delays, the counter 32 is gated so as to produce an information level signal during the 201st count interval on a lead 40 by "anding" the principal outputs of the first, fourth, seventh and eighth flip-flops and the complementary outputs of the remaining flip-flops. This information level signal is applied to the remaining input of the "and" gate 37 to reset counter 32 and to the input of an inverter 41, the output of which is applied to the remaining input of the "and" gate 35. Thus, the counter 32 recycles every 201 counts. Alternatively, if it is desired to have progressively increasing delays, the principal outputs of the first, second, third, seventh and eighth flip-flops and complementary outputs of the remaining flip-flops counter 32 are "anded" as above thereby is adapted to recycle counter 32 every 199 counts. The information level signal generated on lead 40 is connected to the lead 16 so as to control the samplers 13. An additional clock pulse may be used at this point, if necessary. Thus, a sample is taken from each channel every 199th or 201st bit interval of rotation wherein 200 intervals constitute one complete revolution of the drum 22.

The counter 34 is employed to generate signals which select the specific samples to be combined to form a beam at a particular angle. The fourth, seventh and eighth principal and the remaining complementary outputs of the flip-flops of the counter 34 are "anded" so as to generate an information level signal on a lead 42 once every revolution of the drum 22, i.e., in the present case, once every 200 counts. This information level signal is applied over the lead 42 to the remaining input of "and" gate 38 and is also applied to the input of an inverter 43, the output of which is applied to the remaining input of "and" gate 36. In view of the foregoing, it is apparent that a single counter could be used to replace the counters 32 and 34, if desired. In addition, however, selected principal outputs of the flip-flops of counter 34 are "anded" so as to generate information level signals for predetermined single bit intervals on leads *a, b, c . . . k* as hereafter specified in connection with the description of FIG. 6. The relative times of occurrence of these information level signals determine the particular sample from each channel which will be applied to each of the beam forming networks A, B, C, D or E. Also, as previously specified, the times of occurrence of the information level signals may compensate for any delay introduced between the write heads 20 and read heads 24, thereby enabling the write and read heads 20, 24 to be disposed at convenient intervals.

Referring now to FIG. 1 of the drawings, each of the beam forming apparatuses A, B, C, D or E each have, respectively, sets 46, 47, 48, 49 and 50 of switch networks which, in turn, include switch networks 51, 52, 53 and 54, corresponding, respectively, to the channels Nos. 1, 2, $m$ and $n$ of the system. In particular, each of the switch networks 51 has an input coupled to the output of read head 24 associated with track No. 1 of the magnetic drum 22; each of the switch networks 52 has an input coupled to the read head 24 associated with track No. 2 of drum 22; each of the switch networks 53 has an input coupled to the read head 24 associated with track No. $m$ of drum 22; and each of the switch networks 54 has an input coupled to the output of the read head 24 associated with track No. $n$ of drum 22. In addition, the sets 46, 47, 48, 49 and 50 of switch networks 51, 52, 53, 54 are gated "on" by the information level signals generated on the leads $a, b, c \ldots k$ of the timing and control logic apparatus 18. In particular, the lead "$a$" is connected to the control input of each of the switch networks 51, 52, 53, 54 of the set 46 of switch networks. Second, of the set 47 of switch networks, the lead "$a$" is connected to the control input of switch network 51, lead "$b$" is connected to the control input of switch network 52, the lead "$e$" is connected to the control input of the switch network 53 and the head "$h$" is connected to the control input of the switch network 54. Third, of the set 48 of switch networks, the lead "$a$" is connected to the control input of the switch network 51, lead "$d$" is connected to the control input of the switch network 52, lead "$i$" is connected to the control input of the switch network 53, and lead "$k$" is connected to the control input of the switch network 54. Fourth, of the set 49 of switch networks, the lead "$h$" is connected to the control input of the switch network 51, lead "$f$" is connected to the control input of the switch network 52, lead "$c$" is connected to the control input of the switch network 53, and lead "$a$" is connected to the control input of the switch network 54. Last, of the set 50 of switch networks, the lead "$k$" is connected to the control input of the switch network 51, lead "$j$" is connected to the control input of the switch network 52, lead "$g$" is connected to the control input of the switch network 53, and lead "$a$" is connected to the control input of the switch network 54. In addition, outputs from the switch network 54. In addition, outputs from the switch network 51, 52, 53, 54 of the set 46 of switch networks are applied to a sum network 56 along with the lead R from the timing and control logic apparatus 18. In operation, the sum network 56 is designed to integrate the voltages applied to the respective inputs over a period of time equal to the delay provided by one revolution of the drum 22. At the end of each sampling period, a pulse waveform generated on the lead R first allows the integrated sample pulses to appear at the output terminals of sum network 56 and then discharges the voltages to enable the voltage samples selected during the following sampling period to be integrated. The output voltage from sum network 56 is applied to a detector 58, the output of which constitutes the beam output A.

Similarly, the outputs from the sets 47, 48, 49 and 50 of switch networks 51, 52, 53, 54 along with the lead R of the timing and control logic apparatus 18 are applied to sum networks 62, 63, 64, 65, respectively. The operation of the sum networks 62, 63, 64, 65 is the same as that of the sum network 56. The outputs from the sum networks 62, 63, 64 and 65 are applied, respectively, to detectors 67, 68, 69 and 70, the outputs of which constitute the beam outputs B, C, D and E.

Figure 4:
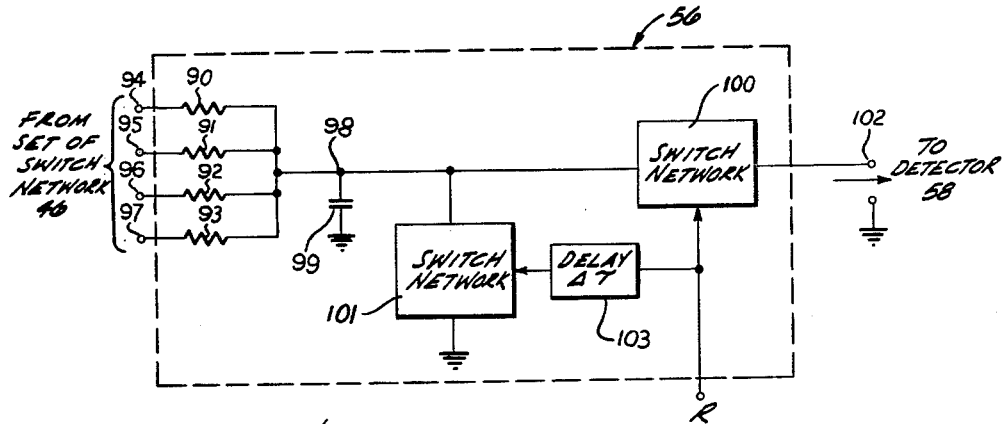
FIG. 4 illustrates a schematic diagram of the sum network of FIG. 1.

To explain the operation of sum networks 56, 62, 63, 64 and 65, reference is made to FIG. 4 of the drawings which illustrates a schematic block diagram of an embodiment of sum network 56, 62, 63, 64 or 65. Referring to FIG. 4, a sum network includes input resistors 90, 91, 92, 93 connected from input terminals 94, 95, 96, 97, respectively, to a common junction 98. A capacitor 99, for storing and integrating the input sample pulses, is connected from the common junction 98 to ground. In addition, switch networks 100, 101 are connected from common junction 98 to an input terminal 102 and to ground, respectively. Lastly, the lead R from the timing and control logic apparatus 18 is connected directly to the control input of switch network 100 and is connected through a delay element 103 to the control input of the switch network 101. In operation, the capacitor 99 integrates the voltage waveforms constituting the samples from tracks Nos. 1, 2, $m$ and $n$ applied to the input terminals 94, 95, 96, 97, and are integrated by the capacitor 99. Inasmuch as the voltage pulses thus applied are of substantially equal width, the voltage developed across the capacitor 99 constitutes an analogue quantity representative of the sum of the amplitudes of the pulses thus applied even though not concurrent. At the end of each sampling interval, a "dump" pulse is generated on lead R by counter 34. This dump pulse is applied to switch network 100 to allow the voltage on capacitor 99 to appear at output terminal 102. The dump pulse is also applied through delay element 103 to switch network 101 thereby to discharge capacitor 99 to ground after the voltage developed thereacross has been allowed to appear at the output terminal 102 and prior to the commencement of the next sampling interval. In this manner, voltages representative of the sum of the input pulses are generated at the output 102 of the sum network shown and described.

Figure 5:
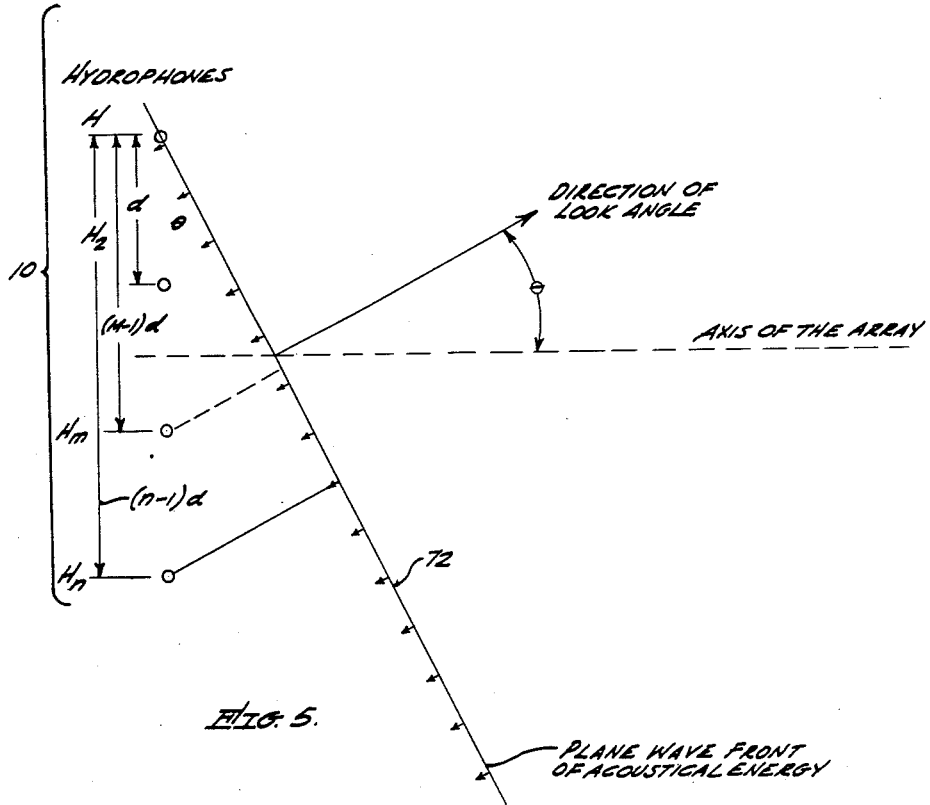
FIG. 5 shows a diagram of an incident plane acoustic wave of a linear array of hydrophones.

To explain more clearly the operation of the disclosed system, reference is now made to FIG. 5 wherein there is illustrated a schematic diagram of a plane wavefront of acoustical energy 72 incident on the linear array 10 of hydrophones $H_1$, $H_2$, $H_m$ and $H_n$ at an angle $\theta$ from an axis normal to the array. As previously specified, the spacing of hydrophone $H_2$ from $H_1$ is $d$; the spacing of hydrophone $H_m$ from $H_1$ is $(m-1)d$; and the spacing of hydrophone $H_n$ from $H_1$ is $(n-1)d$. Accordingly, the additional distance necessary for the wavefront 72 to travel to reach a hydrophone $H_m$ from the instant that it is incident on the hydrophone $H_1$ is $$[(m-1)d \sin \theta] \tag{1}$$

and the interval of the time necessary for the acoustic wave 72 to travel to hydrophone $H_m$ is equal to $$1/V[(m-1)d \sin \theta] \tag{2}$$

where V is the velocity of sound in water. It is thus apparent that the delay with which the wavefront 72 arrives at each hydrophone $H_m$ can be accurately calculated or, in any event, measured for any angle of incidence, $\theta$. Accordingly, when the signal received by the hydrophones on which the wavefront 72 is first incident is delayed by progressively increasing amounts prior to combining them with the signal from the hydrophone $H_n$ on which the wavefront 72 is last incident, the energy received by each of the hydrophones $H_1$, $H_2$, $H_m$ and $H_n$ will then be in phase for some angle $\theta$ with respect to the axis of the array 10. Also, even if the acoustic wave 72 is not present, when the respective delays are introduced the array 10 will "listen" along a beam having the direction $\theta$. The direction $\theta$ may be varied by selecting different delay intervals.

Figure 6:
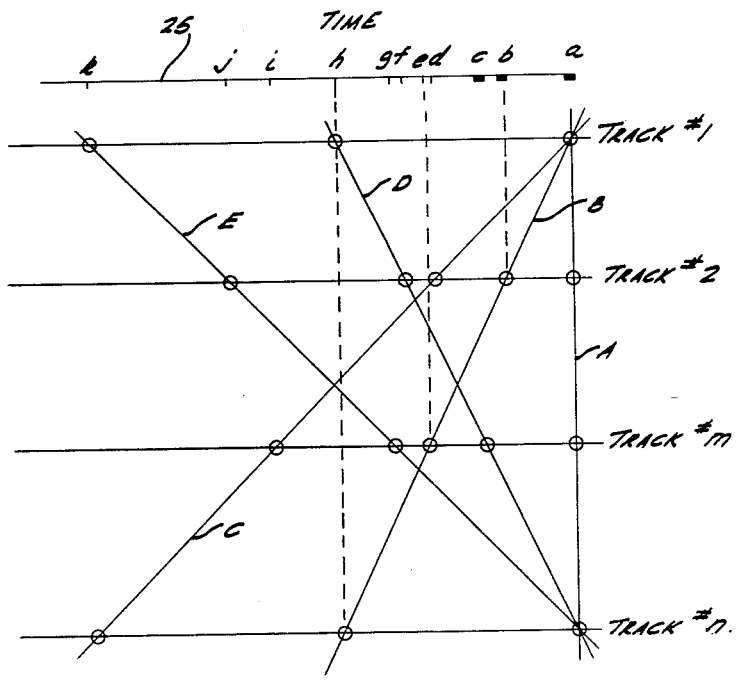
FIG. 6 shows the manner in which samples are selected in order to look in directions normal to the wavefronts A, B, C, D and E.

Referring now to FIG. 6, there is illustrated a plan view of the tracks Nos. 1, 2 $\ldots m \ldots n$ about peripheries of the drum 22 wherein $a, b, c \ldots k$ designate the bit intervals along the time track 25 during which information level signals are generated on the leads $a, b, c \ldots k$, respectively. It may be assumed that the delay intervals illustrated in FIG. 6 progressively increase from right to left, as viewed in the drawing, i.e., a recycling time of 199 counts is employed for counters 32 and 34. A wavefront A is broadside to the array 10 and hence requires concurrent samples from each of the tracks 1, 2, m and n. To select these samples, an information level signal is generated on lead a by the passing of the newest recorded sample beneath the respective read heads 24. Also, as previously specified, the lead a is applied to each of the control inputs to the switch networks of set 46 so the concurrent samples are applied to beam forming apparatus A. It is, of course, not essential that the concurrent samples represent the newest recorded samples. It is only necessary that the samples employed to form the broadside beam be concurrent.

With regard to beam forming apparatus B, on the other hand, the signals from channels n, m and 2 must be delayed relative to the signals from channels m, 2 and 1, respectively, the exact amount depending on the spacing of the hydrophones $H_1$, $H_2$, $H_m$ and $H_n$. In any event, a sample is chosen that has a delay nearest to the desired delay. In the case of wavefront B, information level signals generated on leads a, b, e and h control the selection of samples from tracks Nos. 1, 2, m and n, respectively. Similarly, information level signals generated on leads a, d, i and k control the selection of samples from tracks Nos. 1, 2, m and n, respectively, to form wavefront C; information level signals generated on leads h, f, c and a control the selection of samples from tracks Nos. 1, 2, m and n, respectively, to form wavefront D; and information level signals generated on leads k, j, g and a control the selection of samples from tracks Nos. 1, 2, m and n, respectively, to form wavefront E. It is to be noted that the actual angles of the wavefronts B, C, D and E relative to the axis of the array as shown in FIG. 5 are generally more than the angle shown. For example, a finite delay along track n can form an "end-fire" beam while a line joining the necessary delay time along track No. n with zero delay time along track No. 1 will not be 90° from the axis of the array, i.e., normal to wavefront A. Also, the lines joining the various delay times along the respective tracks may not always be straight but may curve by amounts depending on the placement of the hydrophones and the type of array employed.

In the operation of the system of the present invention, it is first noted that the gated counter 34, FIG. 3, which controls the selection of the samples to be added, is recycled in the same number of bit intervals as the gated counter 32 which controls the rate at which samples are taken from the input signals to the channels 1, 2, m and n which is one different from the number of bit intervals in a revolution. It is thus apparent that each set of samples applied to the beam forming apparatus A, B, C, D and E will be immediately adjacent the previous set on each of the respective tracks Nos. 1, 2, m and n. Also, in that the drum 22 is rotated at an angular velocity of the order of 2000 revolutions per second, it is apparent that substantially 2000 samples and 2000 additions are made and performed per second. This rate of sampling provides approximately five samples and five additions during each complete cycle of the output signal at the highest frequency which would be handled. It is well known that signals can be reconstituted with little distortion with three or more samples per cycle.

Figure 7:
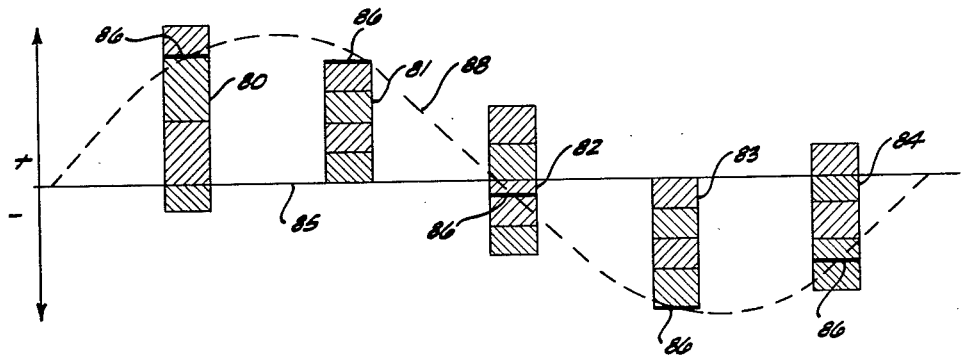
FIG. 7 illustrates the manner in which sample pulses are combined and detected to produce an output signal.

Referring to FIG. 7, pulse waveforms 80, 81, 82, 83 and 84 represent five successive additions by one of the sum networks 56, 62, 63, 64 or 65 wherein the cross-hatched portions thereof represent the contributions of each sample to the respective pulse.

Further, the distance between the reference level 85 and the respective heavy-line portions 86 of each pulse represents the resulting sum of the five successive sets of samples. The resulting pulse waveforms 80–84 are then applied to the appropriate detectors 58, 67, 68, 69 or 70 to convert the pulses into a sinusoidal waveform having a general configuration similar to that illustrated by dashed-line 88. The extent to which the dashed-line 88 conforms to the peaks or average values of the pulses 80–84 depends to a large extent on the type and characteristics of the detectors employed. Thus, output signals indicative of acoustic waves received from the various beam directions are produced at the output terminals of beam forming apparatuses A, B, C, D and E.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. A multiple-beam beam-forming apparatus for an array of hydrophones capable of converting acoustical waves incident thereon into electrical signals, said apparatus comprising means responsive to each one of said hydrophones for amplifying only the frequency components of said electrical signals which are of frequencies less than a predetermined frequency that is no more than 1000 cycles per second; means for periodically sampling each of said amplified electrical signals; a magnetic drum having a track for each of said hydrophones; means for recording a predetermined number of the most recent samples from each of said signals in sequence along corresponding tracks of said magnetic drum; means for sequentially reading samples from each of said tracks having delays therebetween proportional to the spacing of the hydrophones in said array thereby to produce successive sets of samples having predetermined relative delays to correspond to a selected direction with respect to the axis of said array; means for successively producing output pulses of amplitudes representative of the sum of the amplitudes of the samples contained in each of said sets thereby to generate samples of acoustical energy received from said selected direction; and means responsive to said output pulses for producing an output signal representative of the envelope of said output pulses thereby to enhance the reception of acoustical energy from said selected direction.

2. The multiple-beam beam-forming apparatus for an array of hydrophones as defined in claim 1 wherein said means for recording a predetermined number of the most recent samples from each of said signals in sequence along corresponding tracks of said magnetic drum includes a write head for each of said tracks; and means for rotating said drum substantially one revolution for each sample period thereby to write the newest respective samples next to the previously written samples.

3. The multiple-beam beam-forming apparatus for an array of hydrophones as defined in claim 2 wherein said drum is rotated slightly more than one revolution for each sample period whereby said predetermined number of most recent samples are recorded in a sequence progressing in the same direction as the direction of rotation of said drum.

4. The multiple-beam beam-forming apparatus for an array of hydrophones as defined in claim 2 wherein said drum is rotated slightly less than one revolution for each sample period whereby said predetermined number of most recent samples are recorded in a sequence progressing in a direction opposite to the direction of rotation of said drum.

References Cited in the file of this patent

UNITED STATES PATENTS

| | | |
|---|---|---|
| 2,897,351 | Melton | July 28, 1959 |
| 2,943,322 | Ashbury | June 28, 1960 |
| 3,039,079 | Walters et al. | June 12, 1962 |

UNITED STATES PATENT OFFICE
CERTIFICATE OF CORRECTION

Patent No. 3,163,844            December 29, 1964

Lynn A. Martin

It is hereby certified that error appears in the above numbered patent requiring correction and that the said Letters Patent should read as corrected below.

Column 2, line 17, for "output" read -- outputs --; column 4, line 44, for "flops counter 32 are "anded" as above thereby is adapted" read -- flops are "anded" as above thereby --; column 5, line 29, for "head" read -- lead --; lines 47 and 48, strike out "In addition, outputs from the switch network 54."; column 6, line 27, for "votlage" read -- voltage --.

Signed and sealed this 4th day of May 1965.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,163,844                  December 29, 1964

Lynn A. Martin

It is hereby certified that error appears in the above numbered patent requiring correction and that the said Letters Patent should read as corrected below.

Column 2, line 17, for "output" read -- outputs --; column 4, line 44, for "flops counter 32 are "anded" as above thereby is adapted" read -- flops are "anded" as above thereby --; column 5, line 29, for "head" read -- lead --; lines 47 and 48, strike out "In addition, outputs from the switch network 54,"; column 6, line 27, for "votlage" read -- voltage --.

Signed and sealed this 4th day of May 1965.

(SEAL)
Attest:

ERNEST W. SWIDER                  EDWARD J. BRENNER
Attesting Officer                  Commissioner of Patents